United States Patent [19]

Coutts

[11] Patent Number: 5,752,239

[45] Date of Patent: May 12, 1998

[54] SELF-SERVICE DEVICE WITH AN ANIMATED USER INTERFACE TO ASSIST THE OPERATOR TO EFFECT A TRANSACTION

[75] Inventor: Michael G. Coutts, Dundee, Scotland

[73] Assignee: NCR Corporation, Dayton, Ohio

[21] Appl. No.: 553,224

[22] Filed: Nov. 7, 1995

[30] Foreign Application Priority Data

Jul. 28, 1995 [GB] United Kingdom .................. 9515513

[51] Int. Cl.⁶ .................................................. G06F 17/00
[52] U.S. Cl. ............................ 705/26; 705/42; 705/43; 345/355; 345/962
[58] Field of Search .................................. 395/339, 348, 395/349, 355, 357, 173, 950, 962; 345/122; 705/26, 42, 43

[56] References Cited

U.S. PATENT DOCUMENTS

| 4,884,199 | 11/1989 | Boothroyd et al. .................... | 395/326 |
| 5,411,272 | 5/1995 | Naka et al. ............................... | 463/33 |
| 5,517,663 | 5/1996 | Kahn ........................................ | 395/800 |

*Primary Examiner*—Gail O. Hayes
*Assistant Examiner*—Barton L. Bainbridge
*Attorney, Agent, or Firm*—Michael Chan

[57] ABSTRACT

A self-service device in the form of a terminal (10) has a display screen (12) on which a sprite (70) such as a human character is caused to appear. In response to operation by a user of a joystick or joypad (30), the sprite moves in an animated manner, for example, appears to walk, across the display screen (12). The user can cause the sprite (70) to investigate a location. Also the sprite (70) can, in response to operation of a control key (40), effect a selected self-service operation, such as dispensing cash in an automated teller machine, for example. The use of an animated sprite (70), movable and operable under the control of a user, provides a more user-friendly interface than known arrangements such as key-controlled menu-driven displays. In another embodiment the self-service device includes a home entertainment console (402) provided with an application cartridge (432) containing software for a self-service transaction controllable by an animated sprite (70).

10 Claims, 11 Drawing Sheets

SELF-SERVICE DEVICE WITH AN ANIMATED USER INTERFACE TO ASSIST THE OPERATOR TO EFFECT A TRANSACTION

BACKGROUND OF THE INVENTION

This invention relates to self-service devices and to a method of operating a self-service device.

The provision and use of self-service devices in shopping locations and in the home is currently growing at an increasing rate. For example, self-service ATMs (automated teller machines) have been in use for some years. These machines can, for example, dispense cash, issue statements or accept deposits. Another type of self-service device may merely provide information to the user, for example, city guides. In the home, devices are available to facilitate interactive transactions such as home banking and home shopping, for example. Such devices can be dedicated for their application, or may be suitably programmed PCs (personal computers). Typically, these known self-service devices have a menu-driven interface, wherein multiple choice questions are asked of the user, using a visual display. The user responds by selecting an answer by operating an appropriate control key or, if the display is a touch-screen, touching an appropriate area of the screen. It has been found that some users find that operating devices having such menu-driven interfaces is not always easy, particularly since such menu-driven interfaces have a tendency to give the user the impression that the device itself has the major role in controlling the progress of a device transaction or operation being effected by the user.

SUMMARY

It is an object of the present invention to provide a self-service device which is easy and intuitive for the user to operate.

Therefore, according to one aspect of the present invention, there is provided a self-service device, including display means, processor means and manually operable control means adapted for manual operation by a user of said device, characterized in that said display means is arranged to display a sprite, and in that said control means is adapted, in response to manual operation by the user, to cause said sprite to move on said display means in an animated manner and effect an interactive transaction.

According to another aspect of the present invention, there is provided a method of controlling the operation of a self-service device, characterized by the steps of displaying a sprite on a display means, and manually controlling said sprite to move in an animated manner on said display means to effect an interactive transaction.

It will be appreciated that in a self-service device according to the invention, the animated sprite on the display becomes the user's "representative" within the transaction which is being effected on the device. The animated sprite can be directed by the user to carry out the user's wishes. Since the sprite is animated, the user has the impression of truly being in control of the sprite's activities, and not merely the sprite's position on the display. Also, an element of fun and enjoyment is introduced into the operation of the terminal, which may have a particular appeal for younger users.

BRIEF DESCRIPTION OF THE DRAWINGS

Embodiments of the present invention will now be described by way of example, with reference to the accompanying drawings, in which.

Figure 1:
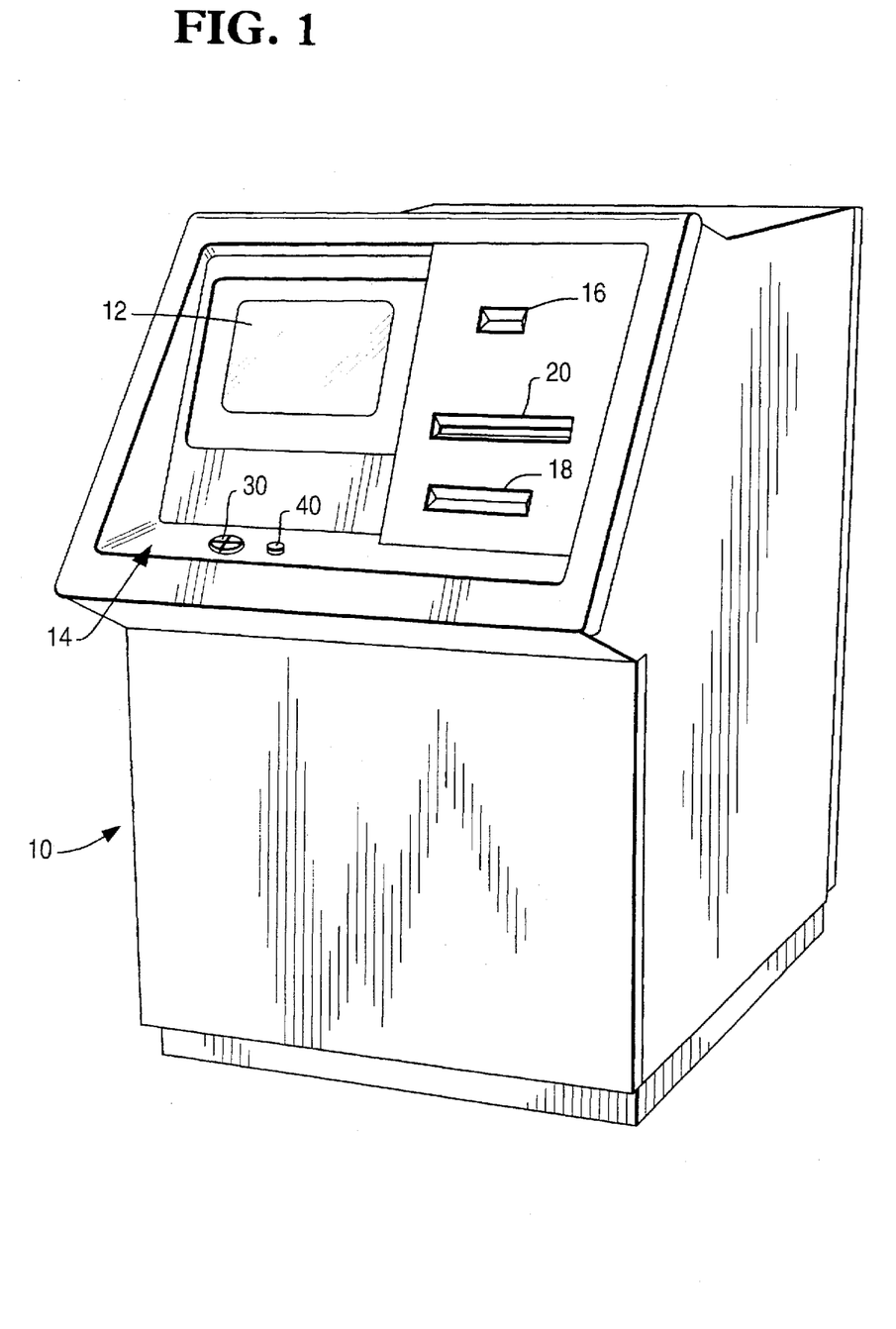
FIG. 1 is a perspective view of a self-service terminal embodying the present invention.

Referring first to FIG. 1, there is shown a simplified perspective view of a self-service terminal 10 in which the present invention may be utilized. The terminal 10 includes a display screen 12 and a control panel 14, which is shown in more detail in FIG. 2. The terminal 10 may include other components, depending on the use to which the terminal is applied. For example there may be a card slot 16 for receiving a user's ID card, a slot 18 for delivering articles, such as currency notes, for example to the user, and a receipt slot 20 for issuing a receipt containing details of a transaction effected by the terminal 10.

Figure 2:
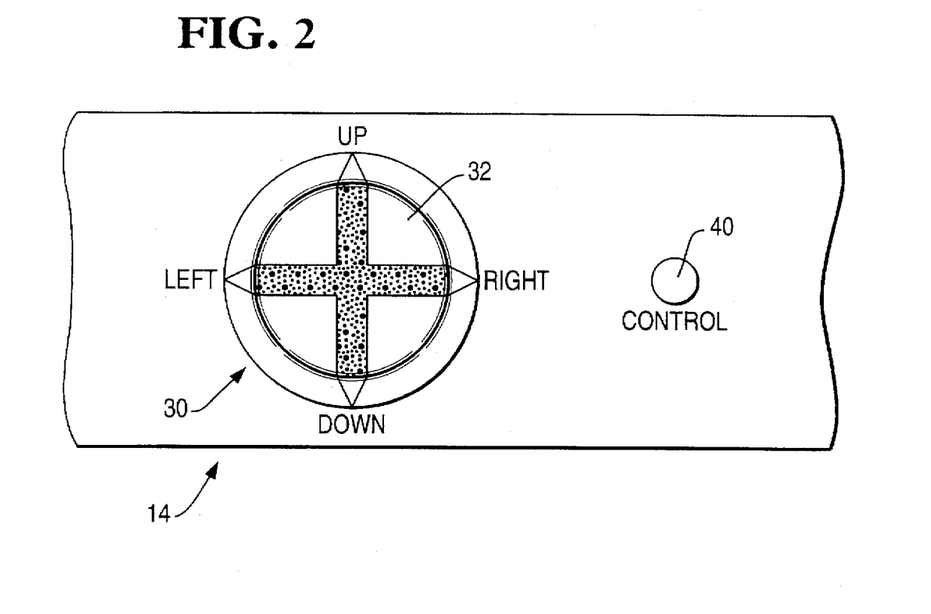
FIG. 2 is an enlarged view of a control panel portion of the terminal shown in FIG. 1.

Referring to FIG. 2, there is shown an enlarged view of the control panel 14. The control panel 14 includes a joypad 30, which, in known manner has a raised surface 32 enabling the user to selectively operate one of four keys (not shown), disposed beneath the surface 32. These keys may be identified is LEFT, RIGHT, UP and DOWN keys by wording provided on the control panel 14. The control panel 14 also includes a control key 40. In a modification, the joypad may be replaced by a joystick, or other direct control device. The purpose of the joypad 30 and control key 40 will be described hereinafter.

Figure 3:
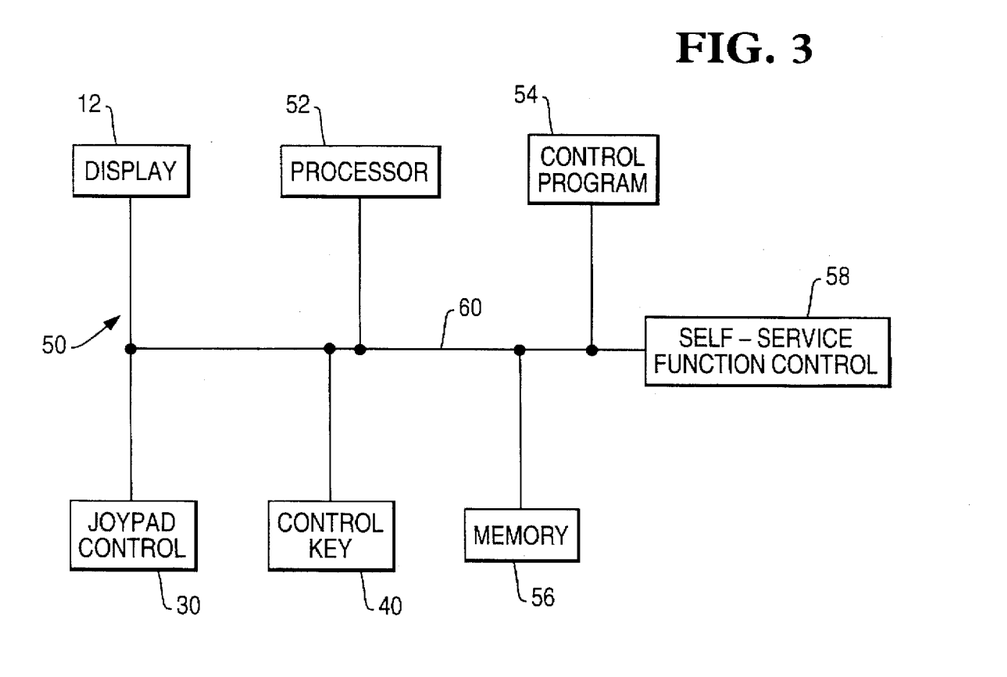
FIG. 3 is a simplified block diagram of electrical circuitry provided in the terminal shown in FIG. 1.

Referring to FIG. 3 there is shown a simplified block diagram of the electrical circuitry 50 contained in the terminal 10. The circuitry 50 includes the display screen 12, the joypad 30 and the control key 40 (all shown in FIG. 1), together with a processor 52 a control program 54, a memory 56 and a self-service function control unit 58. The control unit 58 may incorporate a telephone line link to a remote computer associated with the self-service function being controlled by the terminal 10. The illustrated circuit blocks are interconnected as shown, by a bus 60. The terminal operates under the control of the control program 54. The self-service function control unit 58 may, if the terminal is an ATM, for example, cause a transaction, such as a cash dispense transaction, to be effected.

Figure 4:
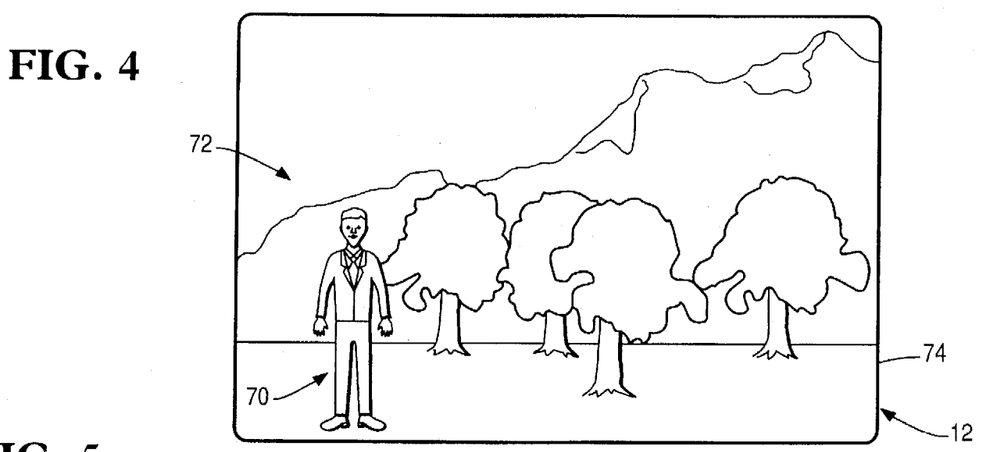
FIG. 4 is a view of the display screen of the terminal shown in FIG. 1, containing a sprite and a background environment.

The operation of the self-service terminal 10 will first be described in general terms, and then a number of specific applications of the terminal will be described. Thus a terminal similar to the terminal 10 may be used by a user to carry out a self-service function, such as location investigation, self-service shopping, financial services advice or the function of an ATM. Upon initiation of the operation of the terminal 10 by a user, for example in response to the insertion of a user's card in the slot 16 (FIG. 11), or activation of a start switch (not shown), a display is produced on the screen 12. Referring to FIG. 4, such display includes a sprite 70 provided on a background 72. As seen in FIG. 4, the sprite 70 is a human like character, but in certain applications, the sprite 70 may take the form of a cartoon type character, an animal character or a mechanical contrivance such as a vehicle, for example. The sprite 70 is a graphics video object produced on the screen 12, and may be moved on the screen under the control of the user by manipulating the joypad 30. The movement of the sprite across the screen 12 is effected in an animated manner, that is, the sprite appears to be animated. For example, if the sprite 70 is a human character, its legs would move to give the sprite the appearance of walking within the environment displayed on the screen as the sprite is moved across the screen under the control of the joypad 30. Alternatively, the sprite may give the appearance of running, or, if an animal or mechanical contrivance, the legs or wheels will move to give the appearance of true movement of the sprite across the screen. For this reason, the sprite 70 is referred to herein as an animated sprite.

Figure 5:
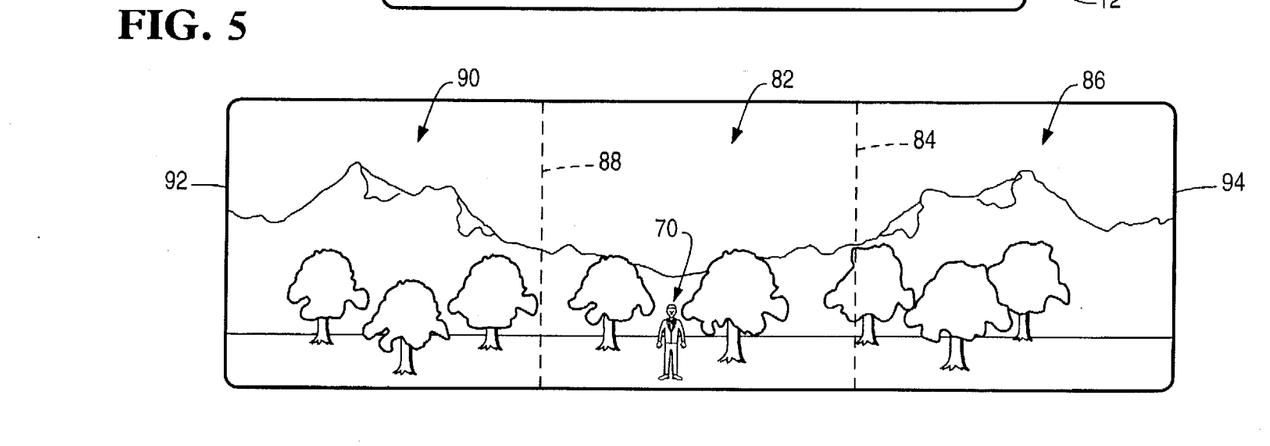
FIG. 5 is a view illustrating alternative backgrounds which may be displayed on the display screen.

Referring still to FIG. 4, the sprite 70 is shown as located in background 72 which purely by way of illustration is shown as a landscape containing trees and hills. By operation of the left and right controls of the joypad 30, the sprite 70 may be caused to face slightly to the left and walk to the left, or face slightly to the right and walk to the right. If the sprite 70 is moved to the right and reaches the right-hand edge 74 of the screen 12, a new background may be displayed. This concept is illustrated in FIG. 5, where the sprite 70 is shown located in a background 82. If the sprite 70 is controlled to walk to the right and walks off the right-hand edge of the screen, illustrated by dashed line 84, then a new background 86 for the sprite 70 will appear on the screen 12. Similarly if the sprite 70 is controlled to walk to the left and walks off the left-hand edge of the screen, illustrated by dashed line 88, then a new background 90 will appear on the screen 12.

In an alternative embodiment it might be arranged that, as the sprite is required to move either to the left or right, the background will be scrolled in the opposite direction in order to give the impression that the sprite is moving through the environment. Referring to FIG. 5, where a scrolled approach was taken the sprite 70 would remain centrally positioned between the display boundaries 88 and 84 and the scenes that make up the environment 90, 82 and 86 would be scrolled to the left when the 70 was being moved to the right and would be scrolled to the right when the sprite 70 was being moved to the left. Only when the extent of the environment was reached fully left on scene 90 or fully right on scene 86 would the sprite 70 move from the central position up to the left edge 92 or right edge 94 as appropriate. Upon return from the edge 92 or 94, the sprite 70 would move to the approximate centre of the scene before scrolling resumed.

It will be appreciated that by controlling the movement of the animated sprite 70 the user is provided with the impression that he or she (the user) is actually investigating the environment background displayed on the screen 12. Furthermore the sprite 72 can have its movement easily reversed, if desired, to retrace its path in the background. Also, by use of the up and down options of the joypad 30 and/or use of the control key 40, the sprite 70 can be controlled to appear to operate levers or buttons or pick up objects displayed on the screen 12. This aspect will now be described.

Figure 6:
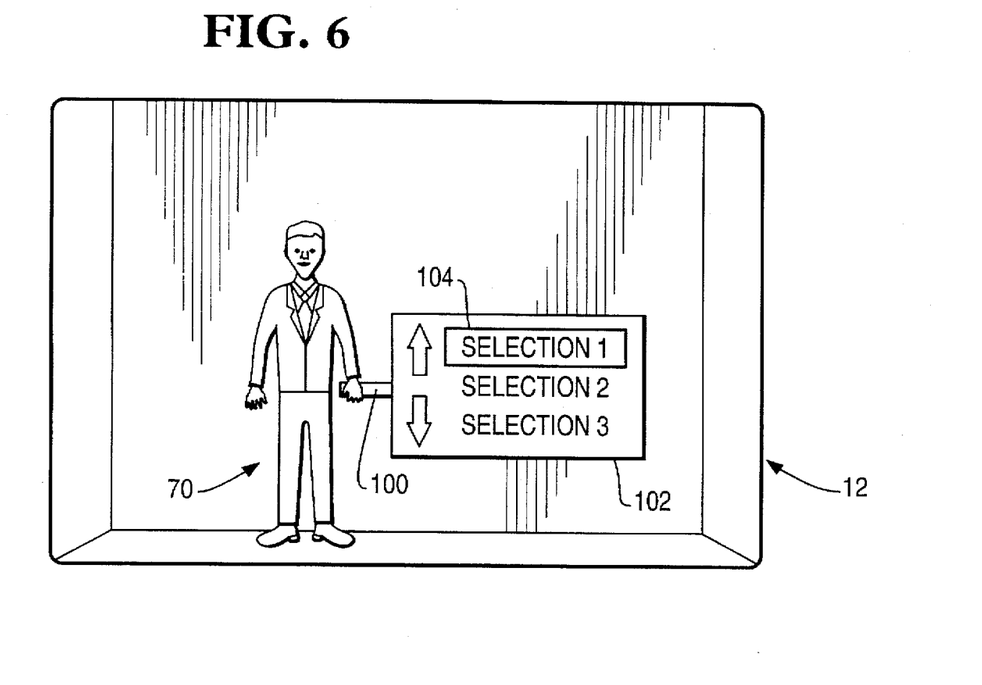
FIG. 6 is a view of the display screen showing a sprite adjacent a lever which can be operated.

Referring to FIG. 6, there is shown the sprite 70 at a location adjacent a lever 100, which the sprite can appear to move to a selected one of three positions, identified as selection 1, selection 2, and selection 3 in a selection box 102 on the screen 12. Thus, if the lever 100 is moved upwards from the position shown to the top position, the selection 1 will be made as indicated by the highlighted area 104. The words actually shown in the selection box 102 will, of course, depend on the particular self-service function for which the terminal 10 is being used.

Figure 7:
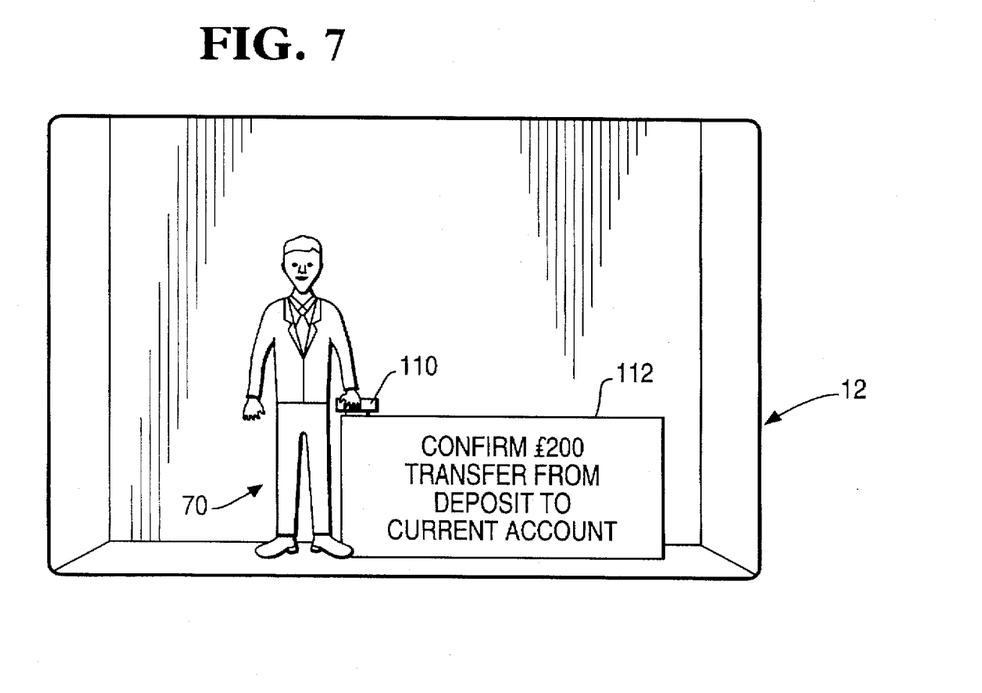
FIG. 7 is a view of the display screen showing a sprite adjacent a button which can be operated.

Referring to FIG. 7, the sprite 70 is shown at a location adjacent a push button 110, then the operation specified in the box 112 is effected. By way of example the words "confirm £200 transfer from deposit to current account" are shown, which might be appropriate in a self-service device being used in a financial application.

The operation of the terminal 10 will now be described with reference to the flowcharts shown in FIGS. 8-12. The main application flow is shown in the flowchart 120 of FIG. 8. The flowchart 120 starts as shown in block 122 and proceeds to block 124 where the application is initialised, a current screen identifier is set to the start screen, the sprite position is set to zero and the sprite is caused to face slightly to the right. As shown in block 126, the current screen is created, thereby causing the initial display (background and sprite) to appear on the screen 12 (FIG. 1). As shown in block 128 the current screen is processed. This procedure will be described hereinafter in more detail with reference to FIG. 9. If processing of the current screen has been completed, the flowchart proceeds to block 130 where the current screen is destroyed (deleted) and the next screen is displayed as the current screen. This represents the procedure when the sprite walks off one edge of the current screen and a new screen then becomes the background as described above, with reference to FIG. 5.

Figure 8:
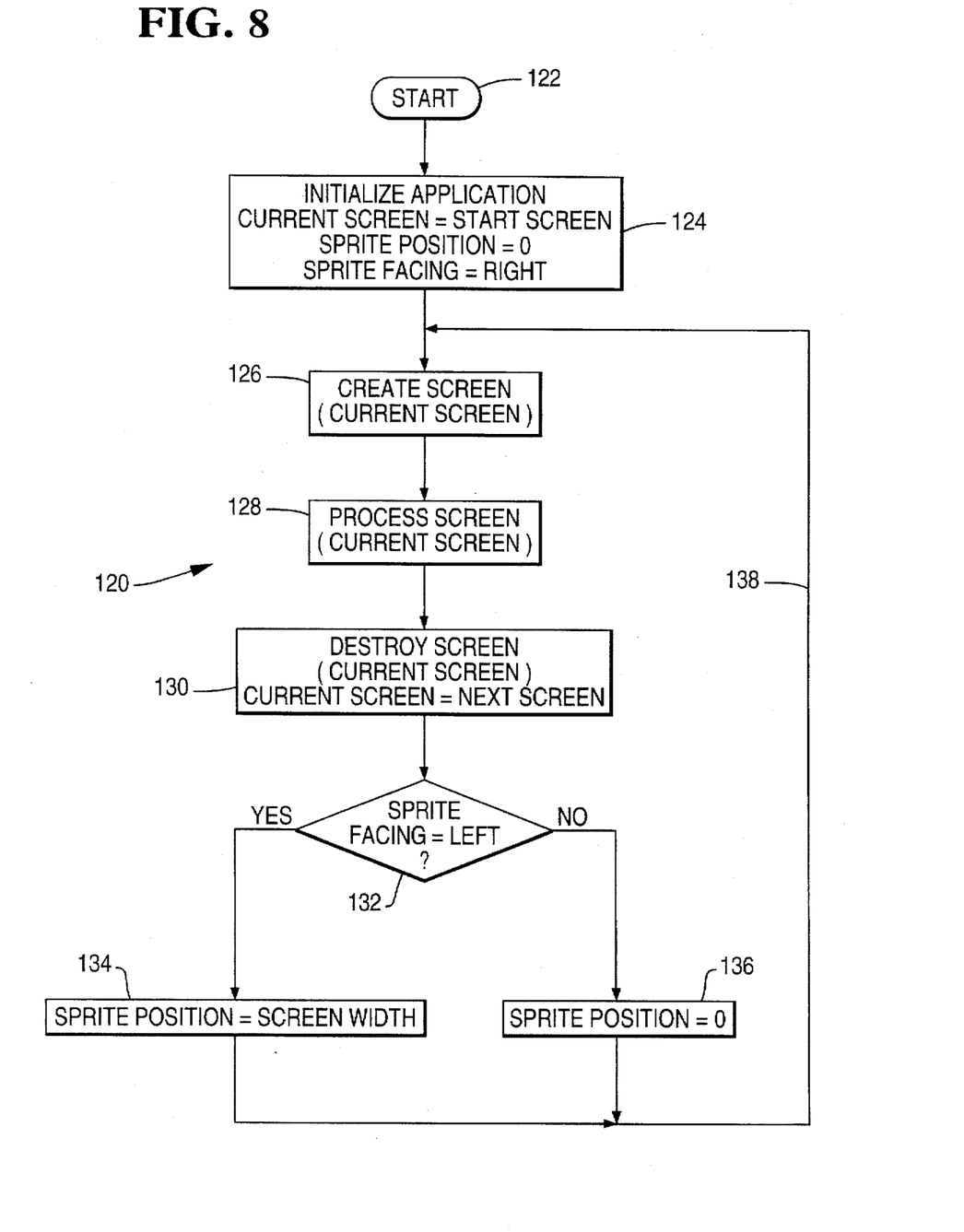
FIGS. 8–12 are flowcharts illustrating the operation of the self-service terminal shown in FIG. 1.

Next, as shown at block 132, a determination is made as to whether the sprite is facing left. If so, the sprite position is set to the screen width (block 134). If not, the sprite position is set to zero (block 136). It will be appreciated that the reason for performing this translation of the position of the sprite, is to retain the belief by the user in the environment in which the sprite in moving, whereby, if the sprite walks off the left-hand side of the current screen, it should naturally walk on from the right-hand side of the next screen, and vice-versa. The flowchart 120 then returns to block 126 over line 138.

Figure 9:
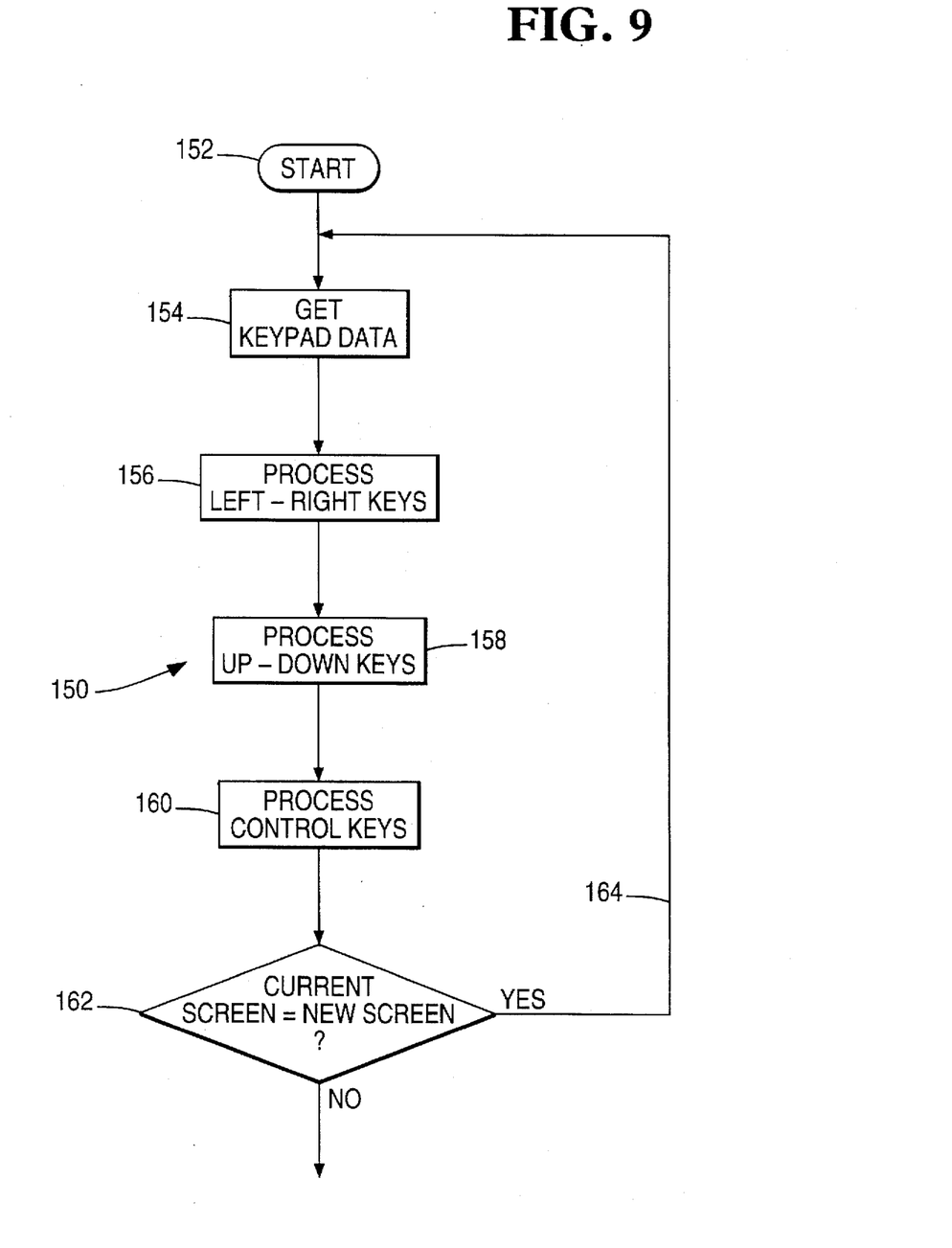

Referring now to FIG. 9, there is shown a flowchart 150 representing the "process screen" block 128 shown in FIG. 8. The flowchart 150 starts at block 152 and proceeds to block 154 where the data from the keypad (i.e. the joypad 30 and control key 40) is acquired. Next, as shown at block 156 the left/right keys of the joypad 30 are processed. This processing will be described in more detail hereinafter with reference to FIG. 10. Then, as shown at block 158, the up/down keys of the joypad 30 are processed. This processing will be described in more detail hereinbelow with reference to FIG. 11. Next, the control key 40 is processed (block 160), as will be described in more detail with reference to FIG. 12. Then, a determination is made as to whether the current screen is to be changed or not (block 162). If the current screen is maintained, the flowchart returns as shown over line 164 to block 154. The flowchart 150 is executed repeatedly and rapidly while the currently displayed screen is maintained.

Figure 10:
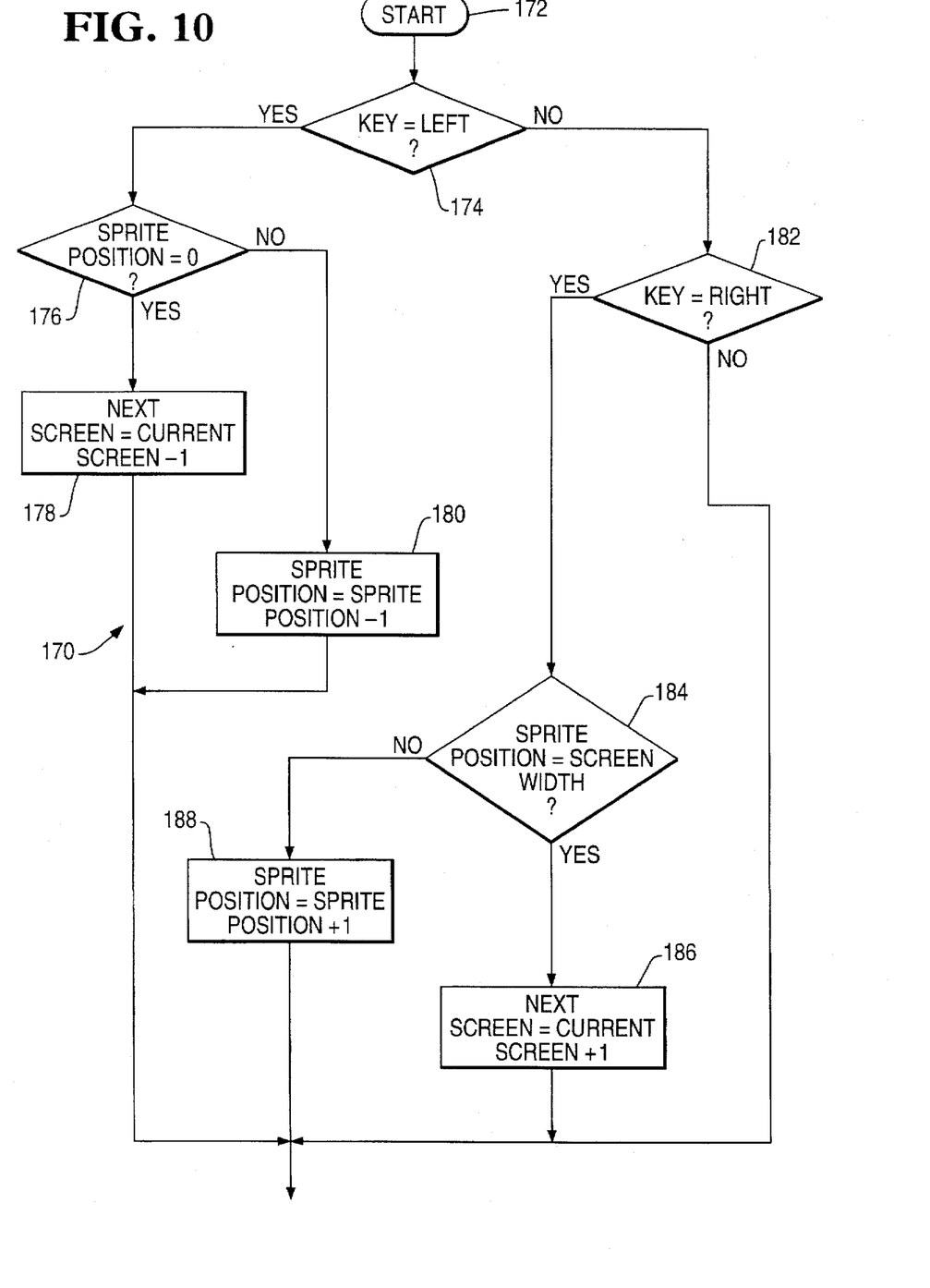

Referring now to FIG. 10, there is shown a flowchart 170 representing the block 158 (FIG. 9). The flowchart 170 starts at block 172. At block 174 a determination is made as to whether the "left" control key of the joypad 30 is operated. If so the flowchart proceeds to block 176 where a determination is made as to whether the sprite position is zero. If so, the display changes to the next screen to the left (block 178) and if not, the sprite position is decremented by one (block 180). Returning to block 174, if the left key is not operated, a determination is made (block 182) as to whether the "right" key of the joypad 30 is operated. If so, a determination is made (block 184) as to whether the sprite position corresponds to the full screen width, i.e. the sprite is located at the right hand edge of the screen. If so, the next background display to the right becomes the current screen (block 186). If not the sprite position is incremented by one (block 188). This completes the processing of the left and right joypad keys.

Figure 11:
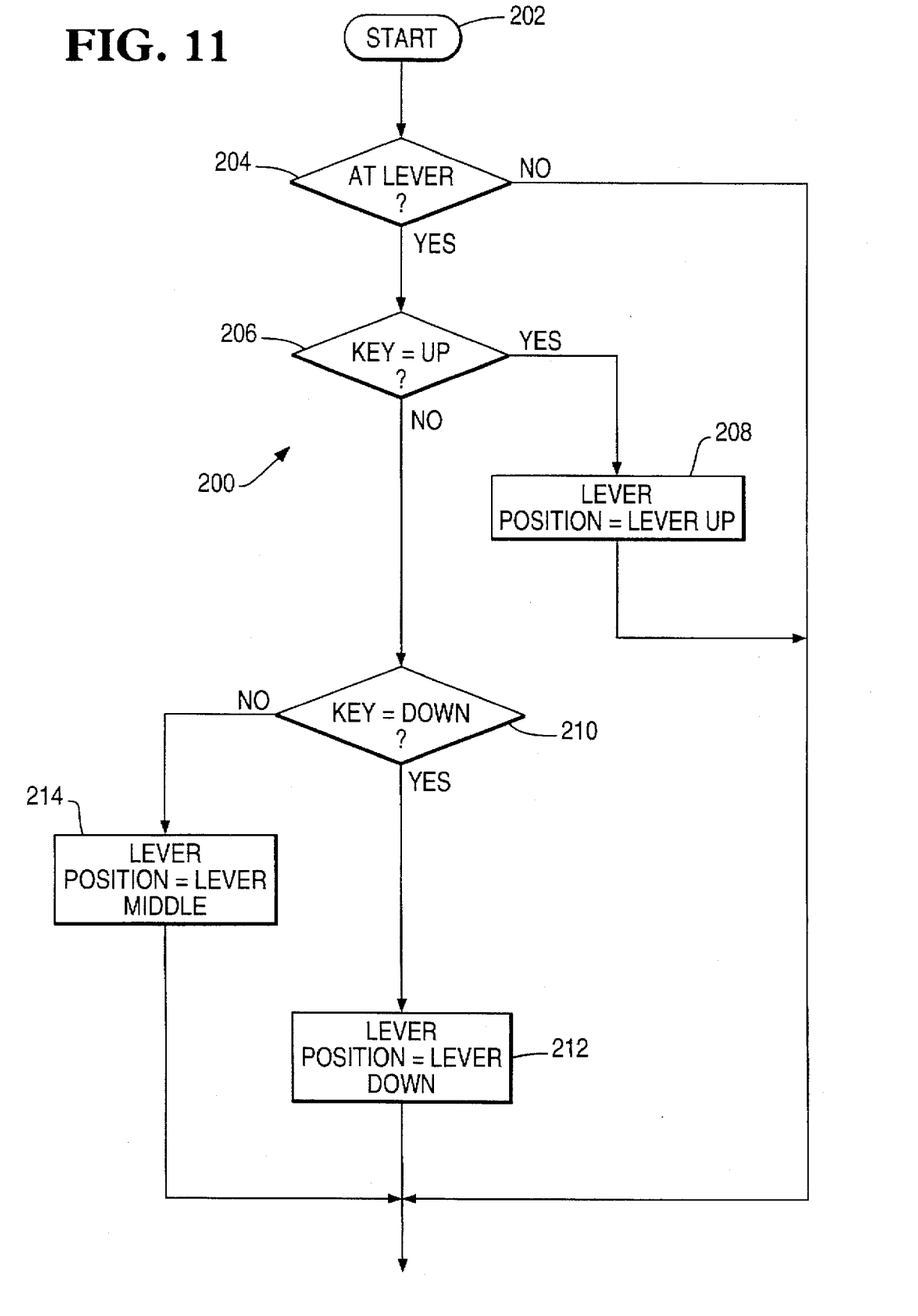

Referring now to FIG. 11, there is shown a flowchart 200 illustrating the processing of the UP and DOWN keys of the joypad 30, corresponding to block 158 in FIG. 9. The flowchart starts at block 202. In block 204, a determination is made as to whether the sprite is located at the lever (as shown in FIG. 6). If so, a determination is made (block 206) as to whether the UP key is operated. If so, the lever is moved to the top position (FIG. 6) as shown in block 208. If not, a determination is made (block 210) as to whether the DOWN key is operated. If so, the lever is moved to the down position as shown in block 212. If not, the middle position of the lever is selected (block 214).

Figure 12:
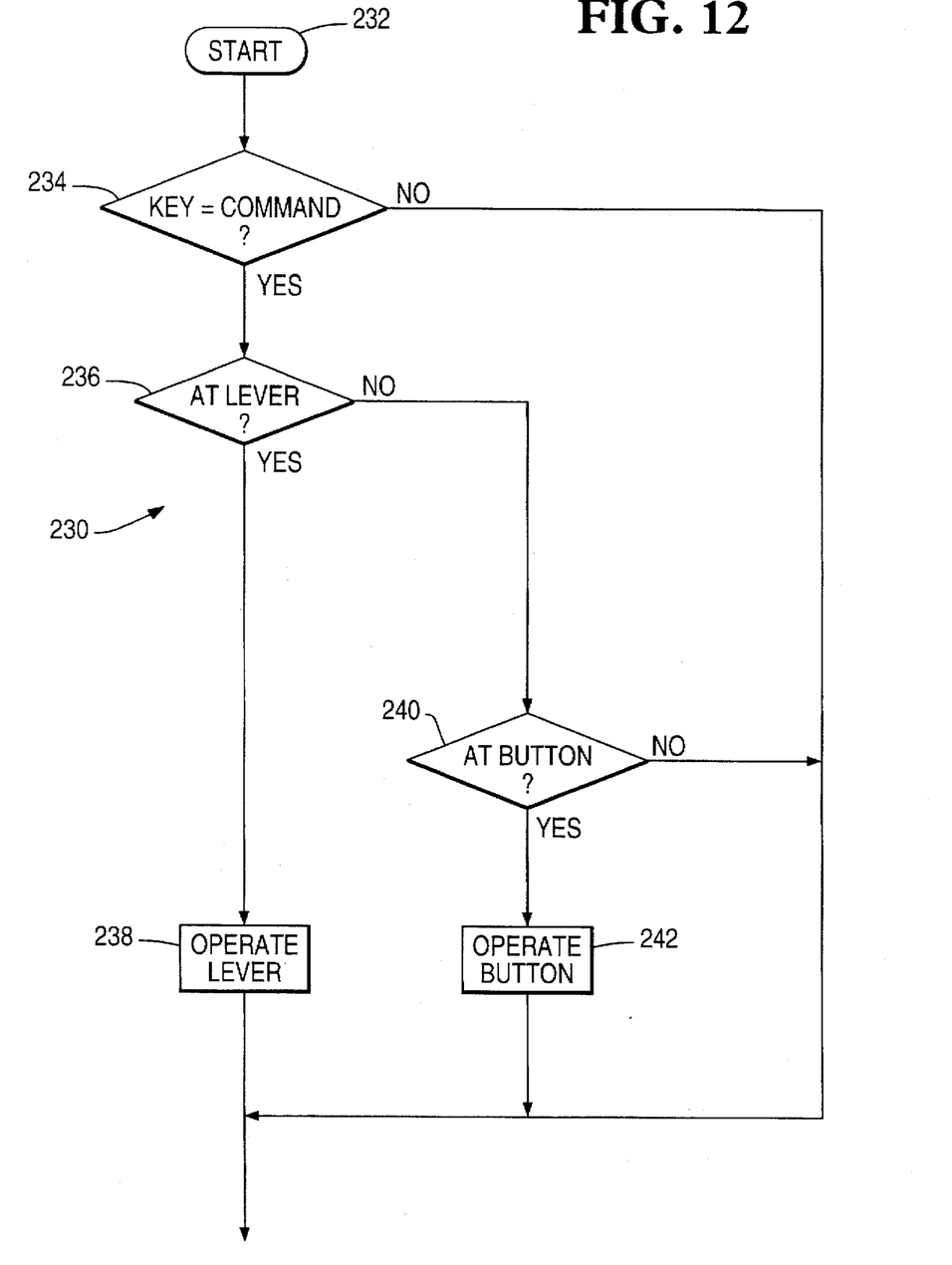

Referring now to FIG. 12, there is shown a flowchart 230 illustrating the processing of the control key 30. The flowchart starts at block 232 and proceeds to block 234 where a determination is made as to whether the control key 30 is operated (to effect a command to the sprite). If so, a determination is made as to whether the sprite is at the lever (block 236). If the sprite is at the lever, the lever is operated (block 238), thereby effecting the desired command function according to the position of the lever. If the sprite is not at the lever (block 236), a determination is made as to whether the sprite is at the button, the button is operated to effect the command to which the button relates.

It will be appreciated that modifications of the procedure described above with reference to the flowcharts of FIG. 8 to 12 are possible. For example, instead of the UP and DOWN keys controlling the position of the lever and the relevant command being effected by operation of the control key 30, according to FIGS. 11 and 12, the control key 30 could be used, when the sprite is located adjacent the lever to cause the sprite to turn towards the lever which is then operated in response to operation of the control key 30.

The above-described self-service apparatus and operation have been discussed in general terms. It will be appreciated that various self-service applications are possible, and some of these will now be described. Firstly an application to location investigation will be discussed. This application is appropriate for providing information, for example, concerning a holiday location such as a town or resort. The sprite in this application would preferably be a human character. In response to operation by the use of the joypad 30 on the self-service device the sprite can be moved around the different areas of the location being investigated. The appropriate background could be formed from images captured from the actual location being investigated, optionally combined with graphical enhancements appropriate to the operation of the sprite within the environment. For example, doors could be opened to enter a new room. These operations could be effected through graphical and video techniques. Thus, referring to FIG. 13, a sprite 300 located in the background of a hotel lobby can be controlled by operation of the joypad 30 on the self-service terminal to walk, i.e. proceed as an animated sprite, towards a door 302. When the sprite reaches the door 302, the door can be caused to open, whereafter a new background environment will appear on the screen 12. Since the sprite 300 is under the control of the user of the self-service device, the location investigation can proceed at a pace under direct user control. This contrasts with a touch screen type of control where the user may be prompted as what to do next as soon as a current screen is presented. With the animated sprite, location investigation is presented in a natural and intuitive manner.

Figure 13:
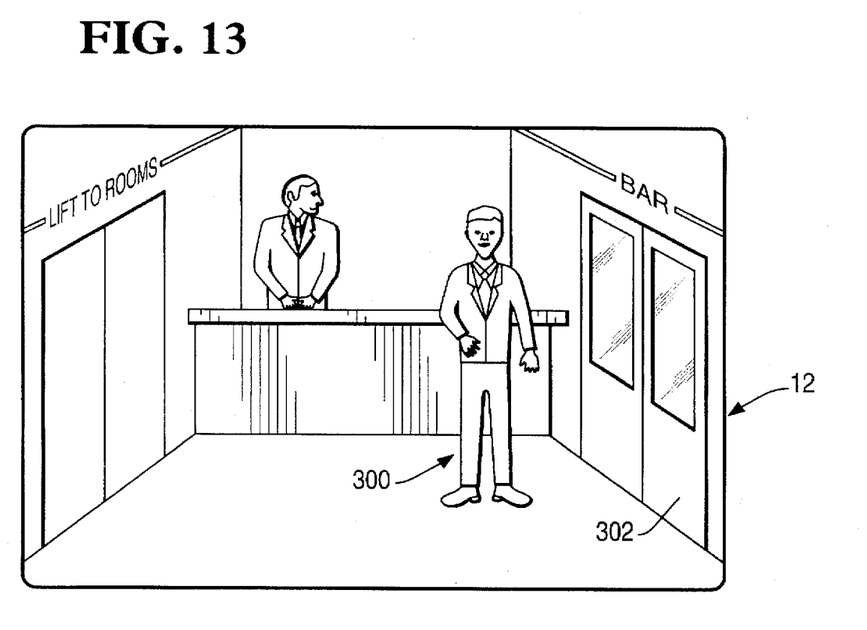
FIG. 13 is a view of the display screen showing a sprite in a location investigation application.

In a further development of the location investigation application, the sprite may be reduced in size and appear on the background of a street map on which various locations, such as hotels are shown. The interior of a selected hotel may be investigated by control of the animated sprite in the manner described above. The location investigation application may involve the movement of the animated sprite through a succession of different background environments, without utilising the concept of operating levers or buttons as described hereinabove. In other words, this self-service application is for the purpose of providing information.

Figure 14:
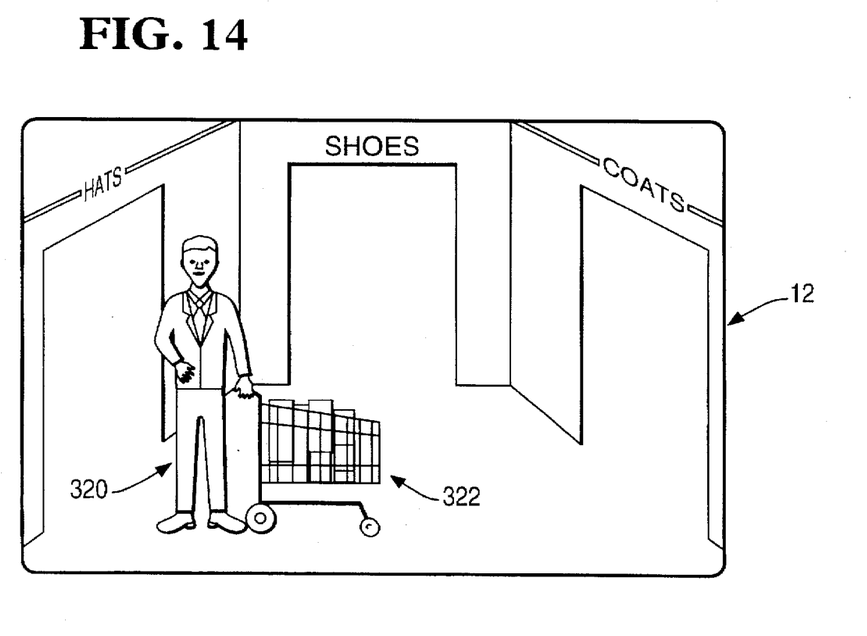
FIG. 14 in a view of the display screen showing a sprite in a retail sales application.

Another application wherein the present mention may be utilized is self-service retail shopping. In this application, a user-controlled animated sprite 320, depicted in FIG. 14 as wheeling a shopping trolley 322 is controlled by operation of the joypad 30 to move in an animated manner to the relevant department of a shop depicted on the screen 12. The sprite 320 may be controlled to cause enlarged views of selected products, for example, through the use of motion video, captured still images or computer modelling techniques. Product specifications may be displayed on the screen in textual form, and/or by an audible description, ostensibly provided by the on-screen animated sprite. In one arrangement, an additional control key may be provided which, when operated, causes the sprite to pick up an article and place it in the trolley. The animated sprite may then be controlled to move to a checkout displayed on the screen. The article could then be paid for, by inserting the user's credit card in the terminal.

Another field in which a user-controlled animated sprite can be advantageously used is that of financial services. Using the terminal, the user manipulates the animated sprite through a background which may be investigated and activated using the animated sprite to provide details of financial services which may be provided. The sprite may take the form of a human character, or, if children or young people are the customers, may take the form of an animal or cartoon type character.

A further application in which a user-controlled animated sprite can be advantageously used is where the self-service device is an ATM (automated teller machine). For adult users, an animated sprite in the form of a human character would be preferable. To initiate operation of the ATM, the user inserts his or her card in the terminal. The display screen 12 can be caused to display a keyboard, which can be used to enter the user's PIN number. As the card insertion takes place the image of the card appears on the display screen and is taken in the hand of the on-screen sprite, thereby signifying to the user that the sprite is under the user's control. To cause the machine to dispense a selected amount of cash, the sprite may be controlled to pick up a money bag, labelled with the selected amount, or picked up from a labelled location. This bag may then be carried by the sprite and caused, by operating a control key, to be dropped into a receptacle in parallel with presentation of the cash by the terminal.

Figure 15:
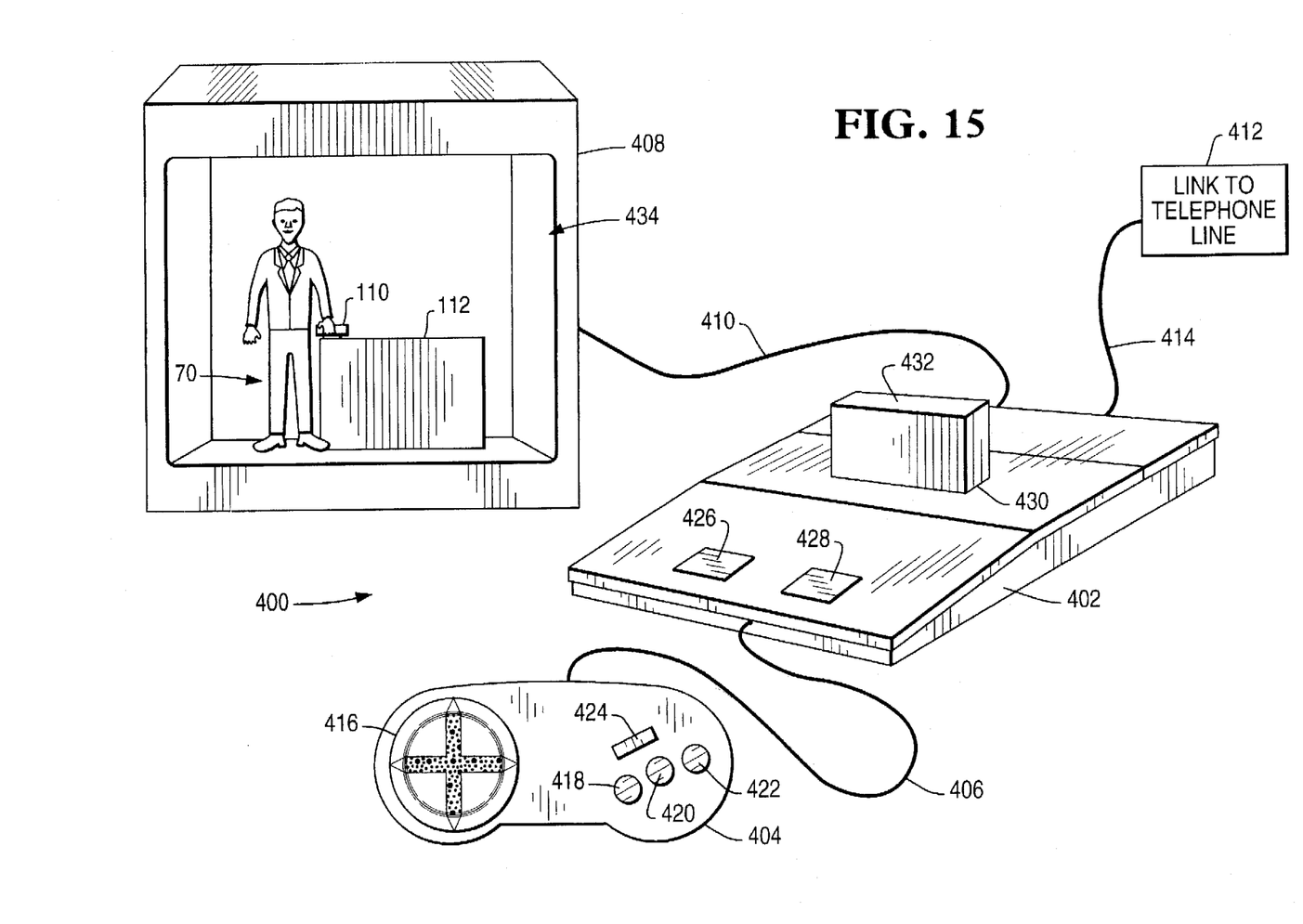
FIG. 15 is a perspective view of an alternative embodiment of a self-service device.

In an alternative embodiment, particularly suitable for use in a home environment, instead of using a dedicated self-service device such as the terminal 10 (FIG. 1), a self-service device in the form of a conventional entertainment console of the kind adapted for connection to a home television set for playing video games could be provided with a suitable application cartridge containing data stored in a semiconductor memory or on a disk. Referring to FIG. 15, there is shown a self-service device 400 including an entertainment console 402 which is connected to a control unit 404 by a cable 406, to a television set 408 by a cable 410, and to a telephone link 412 by a cable 414. The control unit 404 includes a joypad 416, which is of the same construction as the joypad 30, described hereinabove. The control unit 404 also includes three control keys 418, 420, 422 and a start/pause button 424. The console 402 includes an on/off power control button 426, a reset button 428 and may include additional control buttons (not shown).

The console 402 also contains a receptacle region 430 into which an application cartridge 432 may be inserted. The application cartridge 432 contains stored software for controlling the operation of a self-service function, such as a financial transaction function, or a home shopping function, for example.

During operation of the self-service device 400, under control of the application cartridge 432, the screen 434 of the television set 408 will display the animated sprite 70 against an appropriate background, and operation of the joypad 416 and one or more of the control keys 418, 420, 422 will cause the sprite 70 to move across the screen 434 in an animated manner, and perform various operations to effect self-service functions, in the manner described hereinabove, with data communication to a remote facility, such as a computer associated with a financial institution or retail sales establishment being effected over the telephone line link 412.

In another embodiment, a PC (personal computer) equipped with a suitable control terminal such as a joystick could be used as a self-service device for the provision of self-service functions, using an animated sprite in the manner described above. This arrangement could be used, for example, for obtaining information from the world-wide web, in a similar manner to the location investigation application described above.

I claim:

1. A self-service retail terminal for allowing a customer of a retail establishment to purchase an item from the retail establishment, the self-service retail terminal comprising:

a display;

a processor for (i) providing a background image representative of the retail establishment on the display, and (ii) providing an animated sprite representative of the customer on the display and movable between different positions within the background image on the display; and a manually operable control device for (i) controlling the processor to control movement of the animated sprite from a first position within the background image on the display to a second position within the background image on the display to select an item for purchase from the retail establishment when the customer manually operates the control device at a first time, and (ii) controlling the processor to complete purchasing the selected item when the animated sprite is at the second position within the background image on the display and the customer manually operates the control device at a second time which is later than the first time.

2. A self-service retail terminal according to claim 1, wherein the background image scrolls when the animated sprite on the display moves from one position to another position within the background image on the display.

3. A self-service retail terminal according to claim 1, wherein the background image changes when the animated sprite on the display moves from one position to another position within the background image on the display.

4. A self-service retail terminal according to claim 1, wherein the control device includes (i) a first control device for controlling movement of the sprite on the display from the first position to the second position within the background image on the display to select the item for purchase, and (ii) a second control device for controlling interaction of the animated sprite on the display within the background image on the display to complete purchasing the selected item.

5. A self-service retail terminal according to claim 1, wherein (i) the control device is connected to a console unit having a detachable application cartridge, and (ii) the console unit is connectable to a television for displaying the animated sprite and the background image on the screen of the television.

6. A self-service financial terminal for allowing a customer of a financial institution to carry out a financial transaction, the self-service financial terminal comprising:

a display;

a processor for (i) providing a background image representative of the financial institution on the display, and (ii) providing an animated sprite representative of the customer on the display and movable between different positions within the background image on the display; and a manually operable control device for (i) controlling the processor to control movement of the animated sprite from a first position within the background image on the display to a second position within the background image on the display to select a financial transaction to be carried out when the customer manually operates the control device at a first time, and (ii) controlling the processor to complete carrying out the selected financial transaction when the animated sprite is at the second position within the background image on the display and the customer manually operates the control device at a second time which is later than the first time.

7. A self-service financial terminal according to claim 6, wherein the background image scrolls when the animated sprite on the display moves from one position to another position within the background image on the display.

8. A self-service financial terminal according to claim 6, wherein the background image changes when the animated sprite on the display moves from one position to another position within the background image on the display.

9. A self-service financial terminal according to claim 6, wherein the control device includes (i) a first control device for controlling movement of the sprite on the display from the first position to the second position within the background image on the display to select the financial transaction to be carried out, and (ii) a second control device for controlling interaction of the animated sprite on the display within the background image on the display to complete carrying out the selected financial transaction.

10. A self-service financial terminal according to claim 6, wherein (i) the control device is connected to a console unit having a detachable application cartridge, and (ii) the console unit is connectable to a television for displaying the animated sprite and the background image on the screen of the television.

* * * * *